(12) United States Patent
Tzeng

(10) Patent No.: US 12,021,475 B2
(45) Date of Patent: Jun. 25, 2024

(54) MOTOR CONTROLLER

(71) Applicant: Global Mixed-mode Technology Inc., Hsin-Chu (TW)

(72) Inventor: Guang-Nan Tzeng, Hsinchu (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 44 days.

(21) Appl. No.: 17/178,253

(22) Filed: Feb. 18, 2021

(65) Prior Publication Data

US 2022/0263438 A1 Aug. 18, 2022

(51) Int. Cl.
*H02P 6/15* (2016.01)
*H02P 6/26* (2016.01)

(52) U.S. Cl.
CPC ............... *H02P 6/153* (2016.02); *H02P 6/26* (2016.02)

(58) Field of Classification Search
CPC .................................. H02P 6/153; H02P 6/26
USPC ..................................................... 318/400.14
See application file for complete search history.

(56) References Cited

U.S. PATENT DOCUMENTS

| | | | | |
|---|---|---|---|---|
| 9,099,949 B2* | 8/2015 | Paek | | H02P 6/153 |
| 2004/0007998 A1* | 1/2004 | Yasohara | | H02P 6/153 |
| | | | | 318/437 |
| 2007/0120519 A1* | 5/2007 | Sakamoto | | H02P 25/03 |
| | | | | 318/722 |
| 2008/0252242 A1* | 10/2008 | Akama | | H02P 23/14 |
| | | | | 318/400.14 |
| 2012/0050922 A1* | 3/2012 | Yamai | | H02P 29/032 |
| | | | | 361/31 |
| 2014/0176031 A1* | 6/2014 | Paek | | H02P 6/182 |
| | | | | 318/400.14 |
| 2018/0175756 A1 | 6/2018 | Leman | | |
| 2018/0183368 A1* | 6/2018 | Murakami | | H02P 6/185 |
| 2018/0294752 A1* | 10/2018 | Motoyama | | H02P 23/14 |
| 2018/0351488 A1* | 12/2018 | Kaidu | | H02P 6/06 |
| 2019/0190410 A1* | 6/2019 | Aoki | | H02P 6/15 |
| 2019/0393825 A1* | 12/2019 | Maeshima | | H02P 29/024 |

FOREIGN PATENT DOCUMENTS

| | | | |
|---|---|---|---|
| CN | 1848659 A | 10/2006 | |
| TW | 201902110 A | 1/2019 | |

* cited by examiner

*Primary Examiner* — Gabriel Agared
(74) *Attorney, Agent, or Firm* — Winston Hsu

(57) ABSTRACT

A motor controller is used for driving a motor, where the motor has a motor coil. The motor controller comprises a switch circuit, a control unit, and a phase detecting unit. The switch circuit is configured to supply a coil current to the motor coil. The control unit generates a plurality of control signals to control the switch circuit. The phase detecting unit generates a phase signal to the control unit. When the phase signal is changed from a first level to a second level, the motor controller starts a phase delay mechanism to reduce the risk of reverse flow of the coil current. The phase delay mechanism lasts a time. The motor controller may utilize the phase delay mechanism in a start mode or a normal operation mode.

18 Claims, 9 Drawing Sheets

MOTOR CONTROLLER

BACKGROUND OF THE INVENTION

1. Field of the Invention

The present invention relates to a motor controller, and more particularly, to a motor controller which is capable of reducing a risk of reverse flow of a coil current.

2. Description of the Prior Art

FIG. 1 is a schematic diagram showing a conventional motor controller 10. The motor controller 10 is used for driving a motor, where the motor has a motor coil L. The motor coil L has a first terminal O1 and a second terminal O2. The motor controller 10 comprises a switch circuit 100, a control unit 110, and a Hall sensor 120. The switch circuit 100 includes a transistor 101, a transistor 102, a transistor 103, and a transistor 104 for supplying a coil current IL to the motor coil L. The Hall sensor 120 generates a Hall signal Vh to the control unit 110 for informing the control unit 110 to switch phases. The control unit 110 generates a first control signal C1, a second control signal C2, a third control signal C3, and a fourth control signal C4 so as to respectively control the ON/OFF states of the transistor 101, the transistor 102, the transistor 103, and the transistor 104.

FIG. 2 is a schematic diagram showing the direction of the coil current IL in a first driving mode of FIG. 1. In the first driving mode, the control unit 110 turns on the transistor 101 and the transistor 104 and turns off the transistor 102 and the transistor 103 by controlling the first control signal C1, the second control signal C2, the third control signal C3, and the fourth control signal C4. At this moment the current flows sequentially from the terminal VCC to the transistor 101, the motor coil L, and the transistor 104 for supplying the electric energy to the motor. FIG. 3 is a timing chart of related signals of FIG. 1. In the first driving mode, the voltage of the first terminal O1 is at a high level while the voltage of the second terminal O2 is at a low level. However, in order to start the motor smoothly, the motor controller 10 must provide enough energy to overcome the static friction, thereby resulting that the motor coil L still has the remaining current after phase switching. FIG. 4 is a schematic diagram showing the direction of the coil current IL in a second driving mode of FIG. 1. Please refer to FIG. 3 and FIG. 4 simultaneously. When the Hall signal Vh is changed from the low level to the high level, the motor controller 10 is switched from the first driving mode to the second driving mode. In the second driving mode, the control unit 110 turns on the transistor 102 and the transistor 103 and turns off the transistor 101 and the transistor 104 by controlling the first control signal C1, the second control signal C2, the third control signal C3, and the fourth control signal C4. Since the coil current IL is still greater than 0 when changing modes, the inductor effect or the inertia motion will result that the coil current IL keeps flowing at the same direction. At this moment the coil current IL flows sequentially from the terminal GND to the transistor 102, the motor coil L, the transistor 103, and the terminal VCC. Finally, the voltage of the terminal VCC will be increased. Thus, the prior-art method tends to result in the overvoltage issue of the terminal VCC and the noise due to relatively large variation of the coil current IL.

SUMMARY OF THE INVENTION

According to the present invention, a motor controller which is capable of reducing a risk of reverse flow of a coil current is provided. The motor controller is used for driving a motor, where the motor has a motor coil. The motor coil has a first terminal and a second terminal. The motor controller comprises a switch circuit, a control unit, a phase detecting unit, and a counting unit. The switch circuit includes a first transistor, a second transistor, a third transistor, and a fourth transistor for supplying the coil current to the motor coil. The first transistor is coupled to a terminal VCC and the first terminal while the second transistor is coupled to the first terminal and a terminal GND. The third transistor is coupled to the terminal VCC and the second terminal while the fourth transistor is coupled to the second terminal and the terminal GND. Furthermore, the switch circuit is an H-bridge circuit. Each of the first transistor and the third transistor is an upper-side switch while each of the second transistor and the fourth transistor is a lower-side switch. The control unit generates a first control signal, a second control signal, a third control signal, and a fourth control signal so as to respectively control the ON/OFF states of the first transistor, the second transistor, the third transistor, and the fourth transistor. The phase detecting unit generates a phase signal to the control unit, so as to inform the control unit to switch phases. The counting unit receives the phase signal for generating an output signal to the control unit.

In a first driving mode, the control unit turns on the first transistor and the fourth transistor and turns off the second transistor and the third transistor by controlling the first control signal, the second control signal, the third control signal, and the fourth control signal. At this moment the current flows sequentially from the terminal VCC to the first transistor, the motor coil, and the fourth transistor for supplying the electric energy to the motor.

When the motor controller is in a start state, the motor controller must provide enough energy to overcome the static friction for starting the motor. When the phase signal is changed from a low level to a high level, the coil current is greater than 0, which reveals that the motor coil still has the remaining current. Thus, according to one embodiment of the present invention, a phase delay mechanism is utilized to reduce the risk of reverse flow of the coil current. When the phase signal is changed, the motor controller starts the phase delay mechanism and then enters a second driving mode. In the second driving mode, the control unit turns on the fourth transistor and turns off the first transistor, the second transistor, and the third transistor by controlling the first control signal, the second control signal, the third control signal, and the fourth control signal. At this moment the current flows sequentially from the terminal GND to the second transistor, the motor coil, and the fourth transistor, resulting that the current flows through the two lower-side switches circularly. Thus, there is no reverse current flowing to the terminal VCC. When the phase signal is changed, the phase delay mechanism last a time, where the time is a predetermined value. That is to say, the second driving mode lasts the time as well. The motor controller may compute the time by the counting unit, where the phase signal may be used to reset the counting unit. When the phase signal is changed, the counting unit starts to count and generates a counting value, such that the counting value is related to the time. Then the counting unit generates the output signal for informing the control unit to stop the phase delay mechanism. In order to reduce the risk of reverse flow of the coil current, there are at least two embodiments as follows:

1. The time is a fixed value. The motor controller may utilize the phase delay mechanism to start a phase changing mechanism after the coil current is released completely.
2. The time is related to a duration time of a previous phase. When the duration time of the previous phase is larger, the time is larger. For example, the time may be proportional to the duration time of the previous phase. The motor controller may utilize the phase delay mechanism to start a phase changing mechanism after the coil current is released completely.

When the coil current decreases to 0, the motor controller stops the phase delay mechanism and enters a third driving mode for starting a phase changing mechanism. In the third driving mode, the control unit turns on the second transistor and the third transistor and turns off the first transistor and the four transistor by controlling the first control signal, the second control signal, the third control signal, and the fourth control signal. At this moment the current flows sequentially from the terminal VCC to the third transistor, the motor coil, and the second transistor for supplying the electric energy to the motor. Motor controller may start the motor and reduce the risk of reverse flow of the coil current sequentially by the first driving mode, the second driving mode, and the third driving mode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
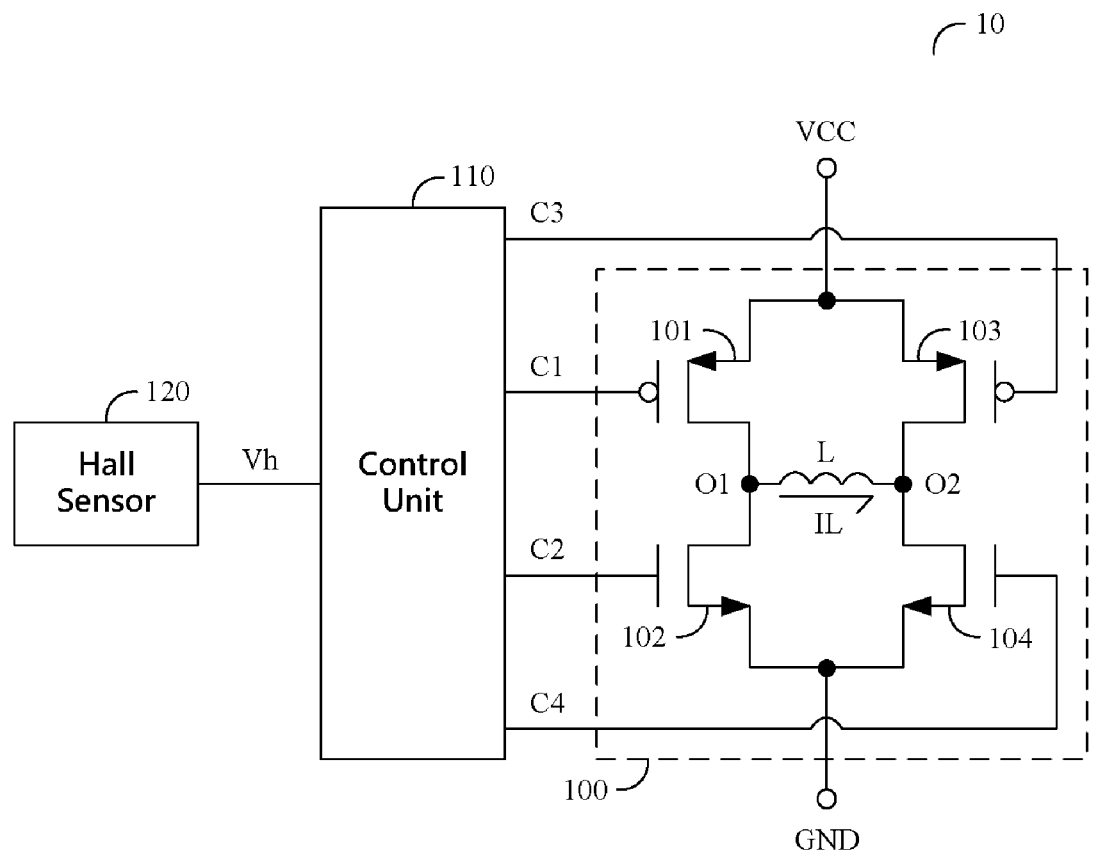
FIG. 1 is a schematic diagram showing a conventional motor controller.
Figure 2:
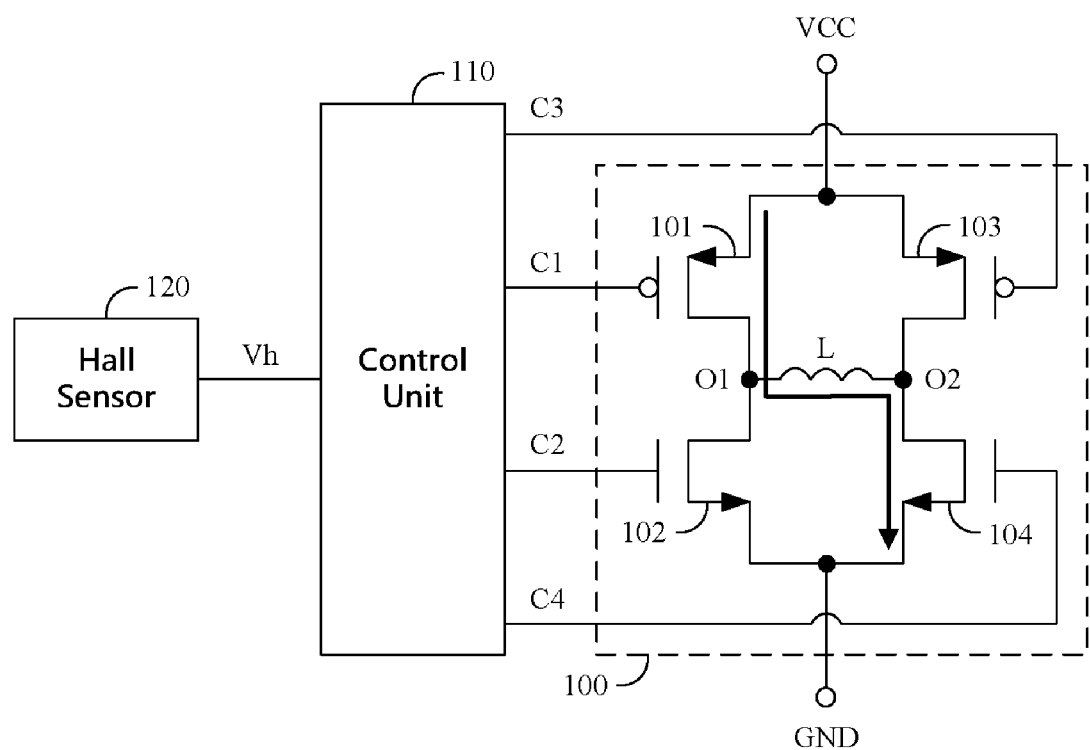
FIG. 2 is a schematic diagram showing a direction of a coil current in a first driving mode of FIG. 1.
Figure 3:
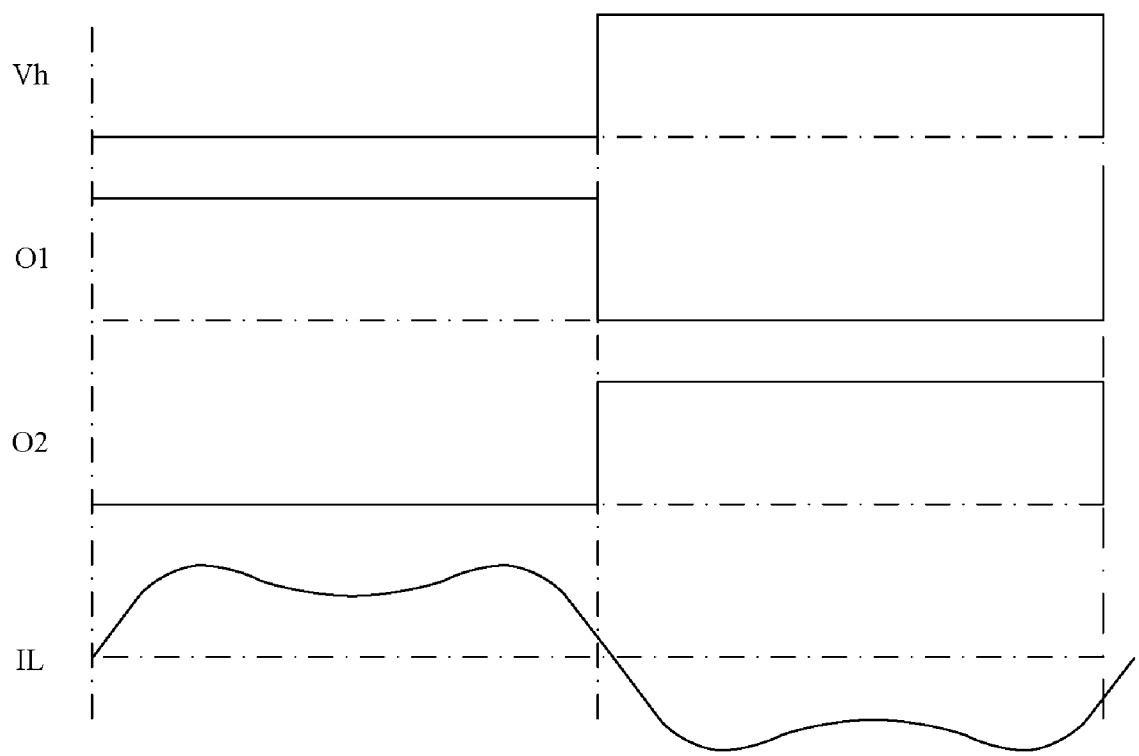
FIG. 3 is a timing chart of related signals of FIG. 1.
Figure 4:
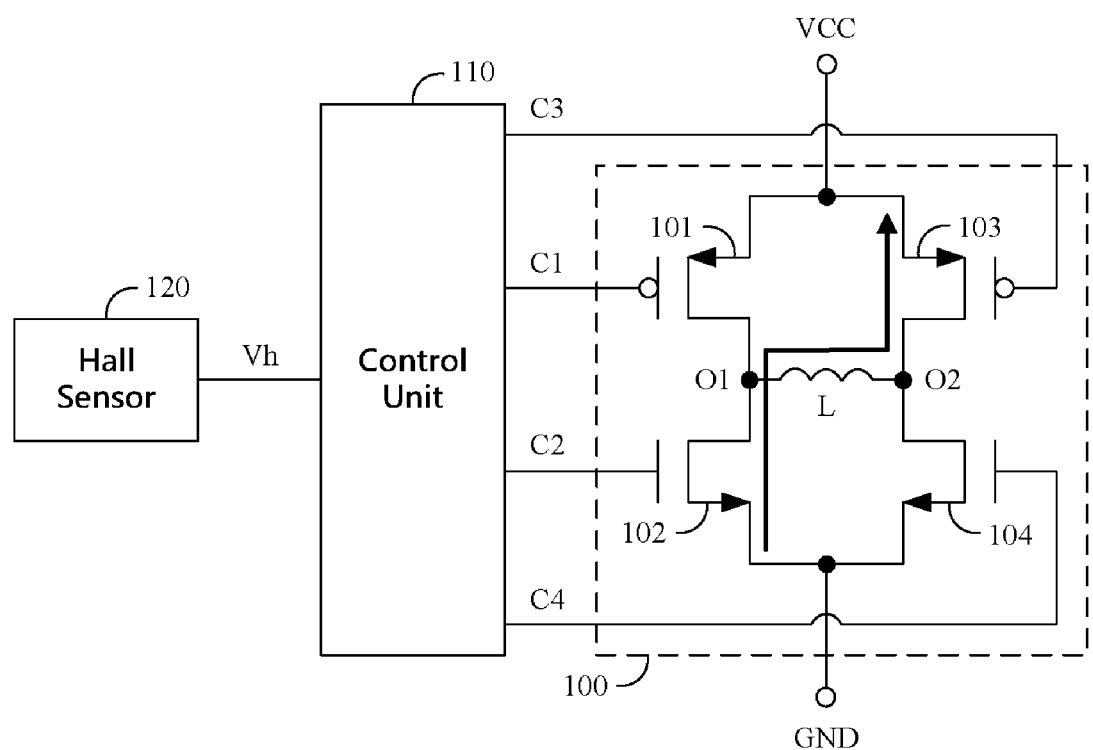
FIG. 4 is a schematic diagram showing a direction of a coil current in a second driving mode of FIG. 1.
Figure 5:
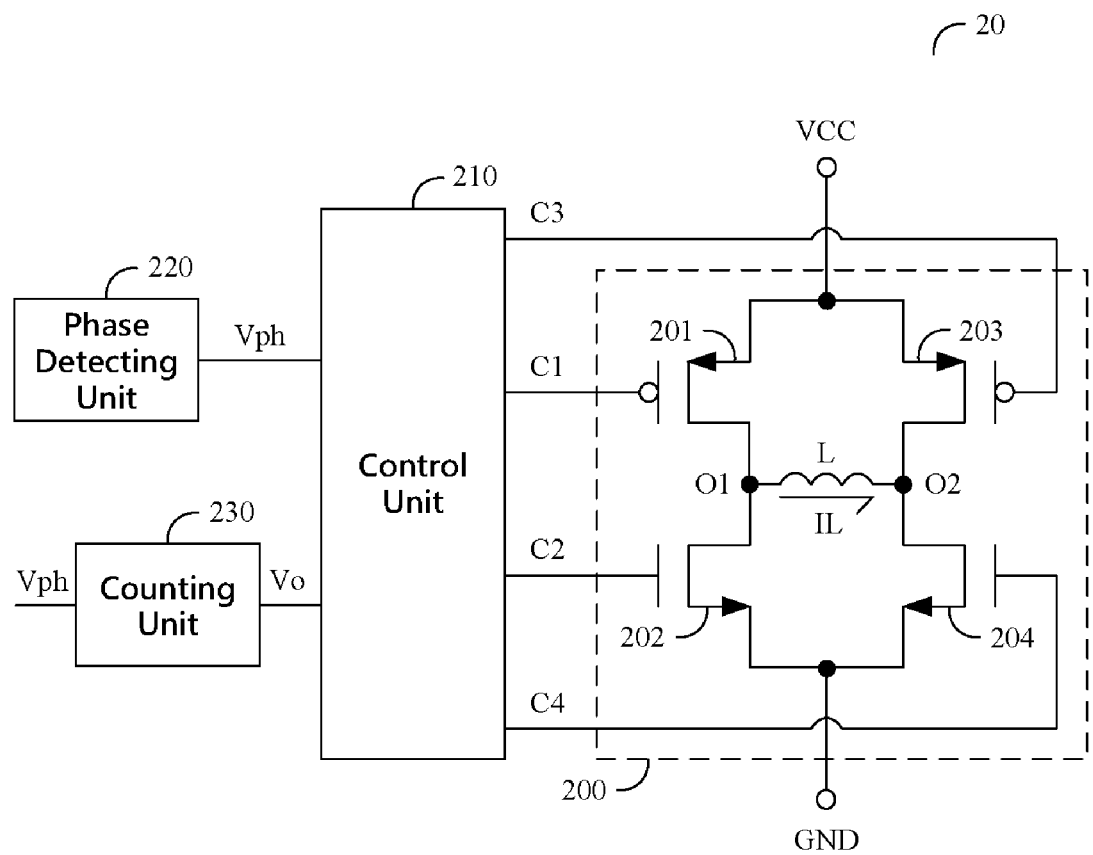
FIG. 5 is a schematic diagram showing a motor controller according to one embodiment of the present invention.

FIG. 5 is a schematic diagram showing a motor controller 20 according to one embodiment of the present invention. The motor controller 20 is used for driving a motor, where the motor has a motor coil L. The motor coil L has a first terminal O1 and a second terminal O2. The motor controller 20 comprises a switch circuit 200, a control unit 210, a phase detecting unit 220, and a counting unit 230. The switch circuit 200 includes a first transistor 201, a second transistor 202, a third transistor 203, and a fourth transistor 204 for supplying a coil current IL to the motor coil L. The first transistor 201 is coupled to a terminal VCC and the first terminal O1 while the second transistor 202 is coupled to the first terminal O1 and a terminal GND. The third transistor 203 is coupled to the terminal VCC and the second terminal O2 while the fourth transistor 204 is coupled to the second terminal O2 and the terminal GND. Each of the first transistor 201, the second transistor 202, the third transistor 203, and the fourth transistor 204 may be respectively a p-type MOSFET or an n-type MOSFET. As shown in FIG. 5, each of the first transistor 201 and the third transistor 203 may be a p-type MOSFET, while each of the second transistor 202 and the fourth transistor 204 may be an n-type MOSFET. Furthermore, the switch circuit 200 is an H-bridge circuit. Each of the first transistor 201 and the third transistor 203 is an upper-side switch while each of the second transistor 202 and the fourth transistor 204 is a lower-side switch.

The control unit 210 generates a first control signal C1, a second control signal C2, a third control signal C3, and a fourth control signal C4 so as to respectively control the ON/OFF states of the first transistor 201, the second transistor 202, the third transistor 203, and the fourth transistor 204. The phase detecting unit 220 generates a phase signal Vph to the control unit 210, so as to inform the control unit 210 to switch phases. The phase detecting unit 220 may be a Hall sensor or a back electromotive force detecting circuit. The counting unit 230 receives the phase signal Vph for generating an output signal Vo to the control unit 210.

Figure 6:
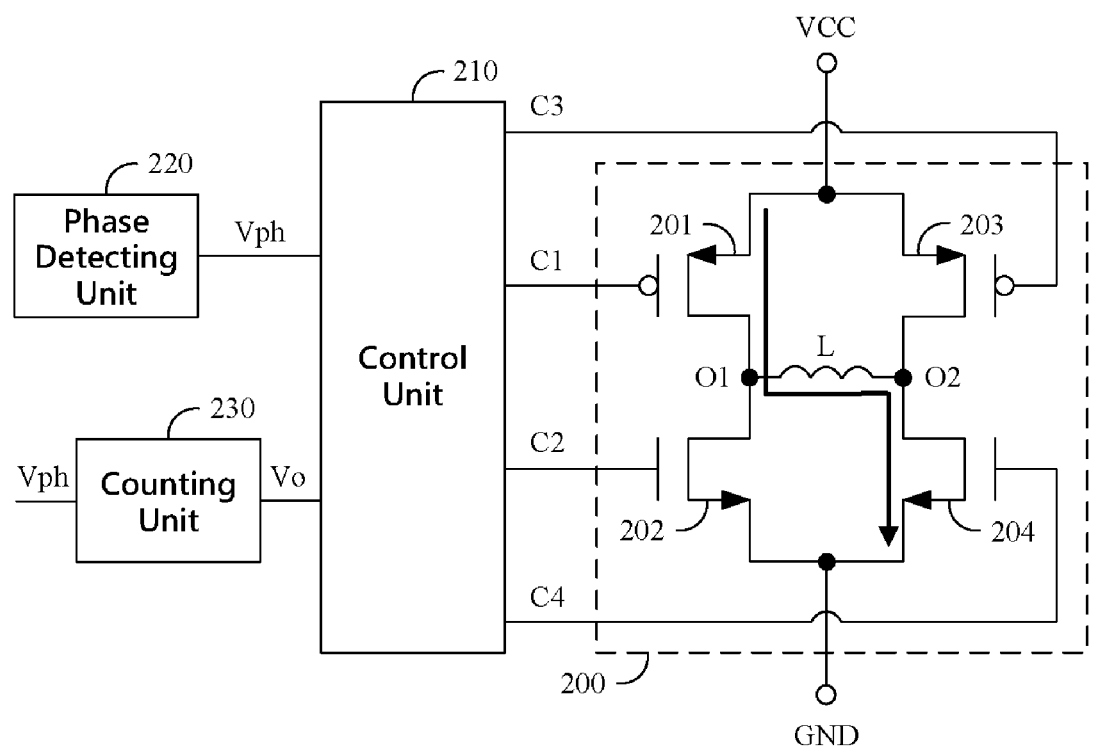
FIG. 6 is a schematic diagram showing a direction of a coil current in a first driving mode of FIG. 5.
Figure 7:
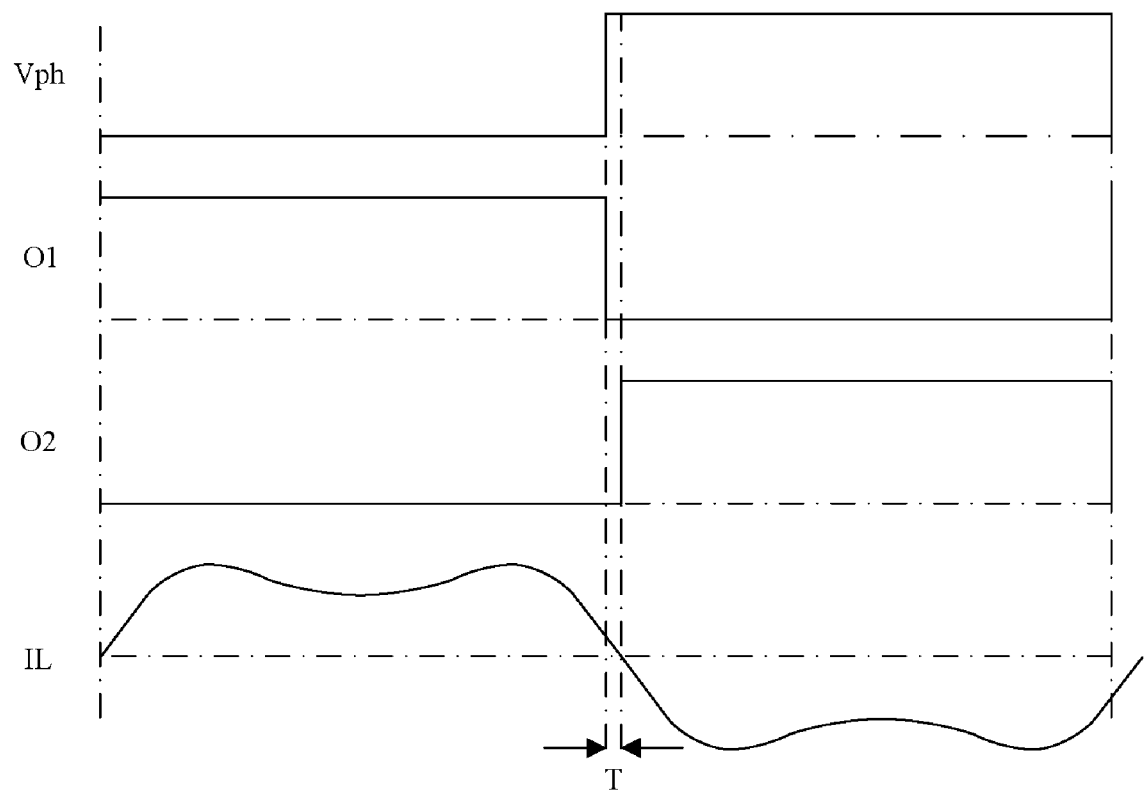
FIG. 7 is a timing chart according to one embodiment of the present invention.

FIG. 6 is a schematic diagram showing the direction of the coil current IL in a first driving mode of FIG. 5. In the first driving mode, the control unit 210 turns on the first transistor 201 and the fourth transistor 204 and turns off the second transistor 202 and the third transistor 203 by controlling the first control signal C1, the second control signal C2, the third control signal C3, and the fourth control signal C4. At this moment the current flows sequentially from the terminal VCC to the first transistor 201, the motor coil L, and the fourth transistor 204 for supplying the electric energy to the motor. FIG. 7 is a timing chart according to one embodiment of the present invention. In the first driving mode, the voltage of the first terminal O1 is at a high level while the voltage of the second terminal O2 is at a low level.

Figure 8:
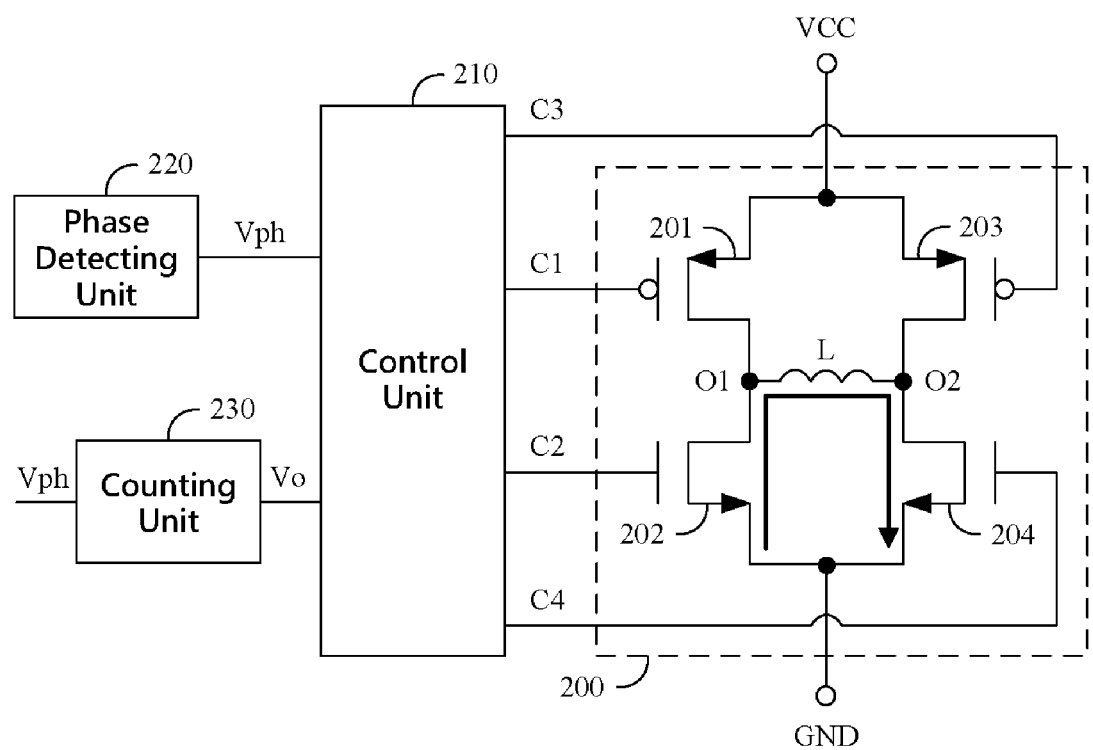
FIG. 8 is a schematic diagram showing a direction of a coil current in a second driving mode of FIG. 5.

When the motor controller 20 is in a start state, the motor controller 20 must provide enough energy to overcome the static friction for starting the motor. As shown in FIG. 7, when the phase signal Vph is changed from the low level to the high level, the coil current IL is greater than 0, which reveals that the motor coil L still has the remaining current. Thus, according to one embodiment of the present invention, a phase delay mechanism is utilized to reduce the risk of reverse flow of the coil current IL. FIG. 8 is a schematic diagram showing the direction of the coil current IL in a second driving mode of FIG. 5. When the phase signal Vph is changed, the motor controller 20 starts the phase delay mechanism and enters the second driving mode. In the second driving mode, the control unit 210 turns on the fourth transistor 204 and turns off the first transistor 201, the second transistor 202, and the third transistor 203 by controlling the first control signal C1, the second control signal C2, the third control signal C3, and the fourth control signal C4. At this moment the current flows sequentially from the terminal GND to the second transistor 202, the motor coil L, and the fourth transistor 204, resulting that the current flows through the two lower-side switches circularly. Thus, there is no reverse current flowing to the terminal VCC. In the second driving mode, the voltage of the first terminal O1 is at the low level and the voltage of the second terminal O2 is at the low level. As shown in FIG. 7, when the phase signal is changed, the phase delay mechanism last a time T, where the time T is a predetermined value. That is to say, the second driving mode lasts the time T as well. The motor controller 20 may compute the time T by the counting unit 230, where the phase signal Vph may be used to reset the counting unit 230. When the phase signal Vph is changed, the counting unit 230 starts to count and generates a counting value, such that the counting value is related to the time T. Then the counting unit 230 generates the output signal Vo for informing the control unit 210 to stop the phase delay mechanism. In order to reduce the risk of reverse flow of the coil current IL, there are at least two embodiments as follows:

1. The time T is a fixed value. The motor controller 20 may utilize the phase delay mechanism to start a phase changing mechanism after the coil current is released completely.
2. The time T is related to a duration time of a previous phase. When the duration time of the previous phase is larger, the time T is larger. For example, the time T may be proportional to the duration time of the previous phase. The motor controller 20 may utilize the phase delay mechanism to start a phase changing mechanism after the coil current is released completely.

Figure 9:
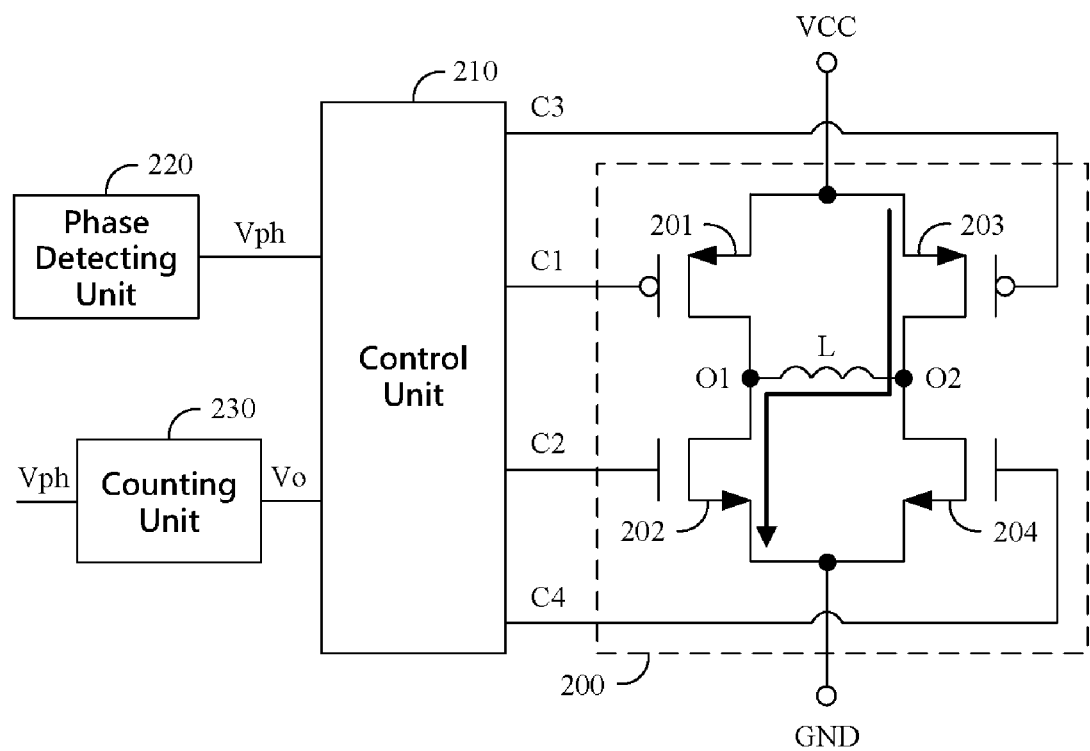
FIG. 9 is a schematic diagram showing a direction of a coil current in a third driving mode of FIG. 5.

When the coil current IL decreases to 0, the motor controller 20 stops the phase delay mechanism and enters a third driving mode for starting a phase changing mechanism. FIG. 9 is a schematic diagram showing the direction of the coil current IL in the third driving mode of FIG. 5. In the third driving mode, the control unit 210 turns on the second transistor 202 and the third transistor 203 and turns off the first transistor 201 and the four transistor 204 by controlling the first control signal C1, the second control signal C2, the third control signal C3, and the fourth control signal C4. At this moment the current flows sequentially from the terminal VCC to the third transistor 203, the motor coil L, and the second transistor 202 for supplying the electric energy to the motor. In the third driving mode, the voltage of the first terminal O1 is at the low level while the voltage of the second terminal O2 is at the high level.

Motor controller 20 may start the motor and reduce the risk of reverse flow of the coil current IL sequentially by the first driving mode, the second driving mode, and the third driving mode. When the motor controller 20 is in a first driving mode, the voltage of the first terminal O1 is at the high level while the voltage of the second terminal O2 is at the low level. At this moment the coil current IL is greater than 0. When the phase signal Vph is changed from a first level to a second level, the motor controller 20 enters the second driving mode, such that the voltage of the first terminal O1 is changed from the high level to the low level while the voltage of the second terminal O2 is kept at the low level. At this moment the coil current IL is still greater than 0. When the motor controller 20 is in the second driving mode, the motor controller 20 starts a phase delay mechanism, such that the coil current IL flows through the two lower side switches circularly and there is no reverse current generated to the terminal VCC. Moreover, the phase signal Vph may be used to reset the counting unit 230. When the phase signal Vph is changed from the first level to the second level, the counting unit 230 starts to count and generates a counting value, resulting that the counting value is related to the time T. Both the phase delay mechanism and the second driving mode last the time T. When the coil current IL decreases to 0, the motor controller 20 stops the phase delay mechanism and enters a third driving mode for starting a phase changing mechanism. When the motor controller 20 is in the third driving mode, the voltage of the first terminal O1 is at the low level while the voltage of the second terminal O2 is changed from the low level to the high level. At this moment the coil current IL is less than 0. The motor controller 20 may sequentially utilize the first driving mode, the second driving mode, and the third driving mode to reduce the risk of reverse flow of the coil current IL and enable the motor controller 20 to be operated in a normal operation mode.

According to one embodiment of the present invention, the motor controller 20 may utilize the phase delay mechanism in a start mode or a normal operation mode. The motor controller 20 may utilize the phase delay mechanism to start a phase changing mechanism after the coil current is released completely. The motor controller 20 may utilize the phase delay mechanism to efficiently reduce the risk of reverse flow of the coil current IL.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller configured to drive a motor, wherein the motor has a motor coil, and the motor controller comprising:
    a switch circuit, configured to supply a coil current to the motor coil;
    a control unit, configured to generate a plurality of control signals to control the switch unit;
    a phase detecting unit, configured to generate a phase signal to the control unit, wherein the phase detecting unit is a Hall sensor or a back electromotive force detecting circuit, when the phase signal is changed from a first digital level to a second digital level, the motor controller starts a phase delay mechanism and does not change a phase immediately, the phase delay mechanism lasts a time, and the time is a predetermined value; and
    a counting unit, configured to receive the phase signal for generating an output signal to the control unit, the counting unit generates a counting value, and the counting value is related to the predetermined time, wherein the motor controller starts the phase delay mechanism to reduce a risk of reverse flow of the coil current.

2. The motor controller of claim 1, wherein when the coil current decreases to 0, the motor controller stops the phase delay mechanism.

3. The motor controller of claim 1, wherein the motor controller utilizes the phase delay mechanism to start a phase changing mechanism after the coil current is released completely.

4. The motor controller of claim 1, wherein the motor controller utilizes the phase delay mechanism in a start state.

5. The motor controller of claim 1, wherein the motor controller utilized the phase delay mechanism in a normal operation state.

6. The motor controller of claim 1, wherein the predetermined time is a fixed value.

7. The motor controller of claim 1, wherein the predetermined time is related to a duration time of a previous phase.

8. The motor controller of claim 7, wherein when the duration time of the previous phase becomes larger, the predetermined time becomes larger.

9. The motor controller of claim 7, wherein the predetermined time is proportional to the duration time of the previous phase.

10. A motor controller configured to drive a motor, wherein the motor has a motor coil, the motor coil has a first terminal and a second terminal, and the motor controller comprising:
   a switch circuit, configured to supply a coil current to the motor coil;
   a control unit, configured to generate a plurality of control signals to control the switch unit; and
   a phase detecting unit, configured to generate a phase signal to the control unit, wherein the phase detecting unit is a Hall sensor or a back electromotive force detecting circuit, when the motor controller is in a first driving mode, a voltage of the first terminal is at a high level and a voltage of the second terminal is at a low level, when the phase signal is changed from a first digital level to a second digital level, the motor controller enters a second driving mode and does not change a phase immediately, such that the voltage of the first terminal is changed from the high level to the low level and the voltage of the second terminal is kept at the low level, the second driving mode lasts a time, and the time is a predetermined value; and
   a counting unit, configured to receive the phase signal for generating an output signal to the control unit, the counting unit generates a counting value, and the counting value is related to the predetermined time, wherein the motor controller starts a phase delay mechanism to reduce a risk of reverse flow of the coil current.

11. The motor controller of claim 10, wherein when the motor controller is in the second driving mode, the motor controller starts a phase delay mechanism.

12. The motor controller of claim 11, wherein when the coil current decreases to 0, the motor controller stops the phase delay mechanism and enters a third driving mode for starting a phase changing mechanism.

13. The motor controller of claim 11, wherein the motor controller utilizes the phase delay mechanism in a start state.

14. The motor controller of claim 11, wherein the motor controller utilized the phase delay mechanism in a normal operation state.

15. The motor controller of claim 10, wherein the predetermined time is a fixed value.

16. The motor controller of claim 10, wherein the predetermined time is related to a duration time of a previous phase.

17. The motor controller of claim 16, wherein when the duration time of the previous phase becomes larger, the predetermined time becomes larger.

18. The motor controller of claim 16, wherein the predetermined time is proportional to the duration time of the previous phase.

* * * * *